(12) United States Patent
He et al.

(10) Patent No.: US 11,055,508 B2
(45) Date of Patent: Jul. 6, 2021

(54) DISPLAY PANEL APPLICABLE TO REDUCING NOISE COUPLING AND ENHANCING SENSING SIGNAL IN OPTICAL FINGERPRINT SENSOR THEREOF WITH AID OF SWITCH ARRANGEMENT, AND ASSOCIATED ELECTRONIC DEVICE

(71) Applicant: HIMAX TECHNOLOGIES LIMITED, Tainan (TW)

(72) Inventors: Jia-Ming He, Tainan (TW); Yaw-Guang Chang, Tainan (TW); I-Lin Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 40 days.

(21) Appl. No.: 16/556,192

(22) Filed: Aug. 29, 2019

(65) Prior Publication Data

US 2021/0064835 A1    Mar. 4, 2021

(51) Int. Cl.
*G09G 3/3233* (2016.01)
*G06K 9/00* (2006.01)
*G09G 3/20* (2006.01)
*G09G 3/3241* (2016.01)

(52) U.S. Cl.
CPC ............. *G06K 9/0004* (2013.01); *G09G 3/20* (2013.01); *G09G 3/3241* (2013.01); *G09G 2300/0426* (2013.01)

(58) Field of Classification Search
CPC ................... G09G 3/3241; G09G 3/20; G09G 2300/0426; G06F 3/0412; G06K 9/0004

USPC ......................................................... 345/175
See application file for complete search history.

(56) References Cited

U.S. PATENT DOCUMENTS

| | | | | |
|---|---|---|---|---|
| 2008/0198143 A1* | 8/2008 | Kinoshita | ............. | G06F 3/0412 345/175 |
| 2019/0279566 A1* | 9/2019 | Wang | ................... | G09G 3/3241 |

FOREIGN PATENT DOCUMENTS

| | | |
|---|---|---|
| CN | 107066960 A | 8/2017 |
| CN | 108134595 A | 6/2018 |
| CN | 108140121 A | 6/2018 |
| TW | I699683 B | 7/2020 |

* cited by examiner

*Primary Examiner* — Abdul-Samad A Adediran
(74) *Attorney, Agent, or Firm* — Winston Hsu (57) ABSTRACT

A display panel and an associated electronic device are provided. The display panel may include: a plurality of display blocks arranged to display images, a plurality of light sensors arranged to perform light sensing, a plurality of sets of switches, and a detection circuit. The plurality of sets of switches may combine the plurality of light sensors into a plurality of combined sensors, respectively, wherein the plurality of sets of switches operate according to a plurality of switching signals, respectively. The detection circuit may be coupled to two sets of combined sensors within the plurality of combined sensors, and arranged to detect a voltage level of a combined sensor of one set of the two sets of combined sensors according to a reference voltage level, for performing fingerprint detection through the display panel, wherein the reference voltage level is obtained from another set of the two sets of combined sensors.

12 Claims, 12 Drawing Sheets

DISPLAY PANEL APPLICABLE TO REDUCING NOISE COUPLING AND ENHANCING SENSING SIGNAL IN OPTICAL FINGERPRINT SENSOR THEREOF WITH AID OF SWITCH ARRANGEMENT, AND ASSOCIATED ELECTRONIC DEVICE

BACKGROUND OF THE INVENTION

1. Field of the Invention

The present invention is related to display devices, and more particularly, to a display panel applicable to reducing noise coupling and enhancing sensing signals in an optical fingerprint sensor thereof with aid of switch arrangement, and an associated electronic device.

2. Description of the Prior Art

Figure 1:
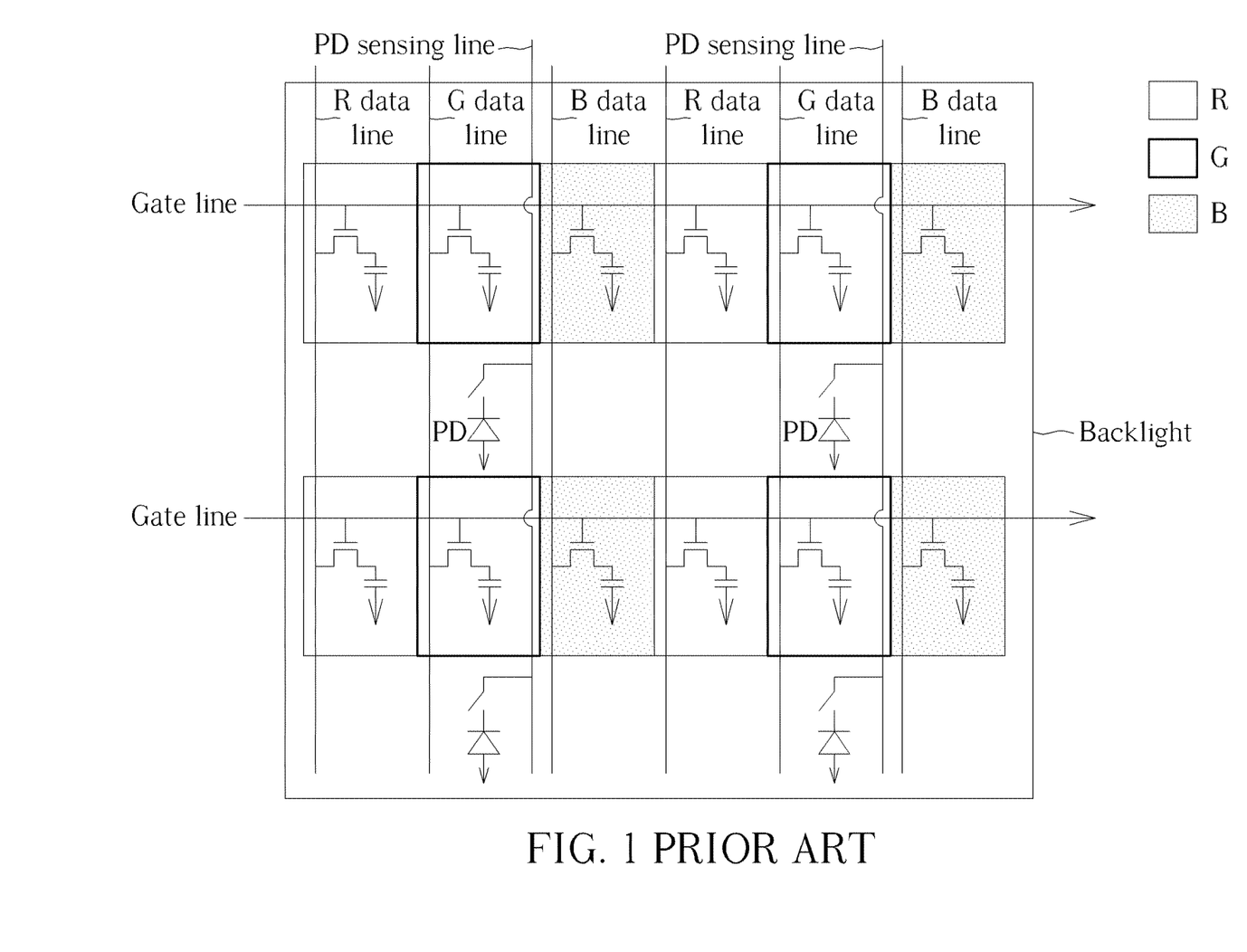
FIG. 1 illustrates an example of a display panel.
Figure 2:
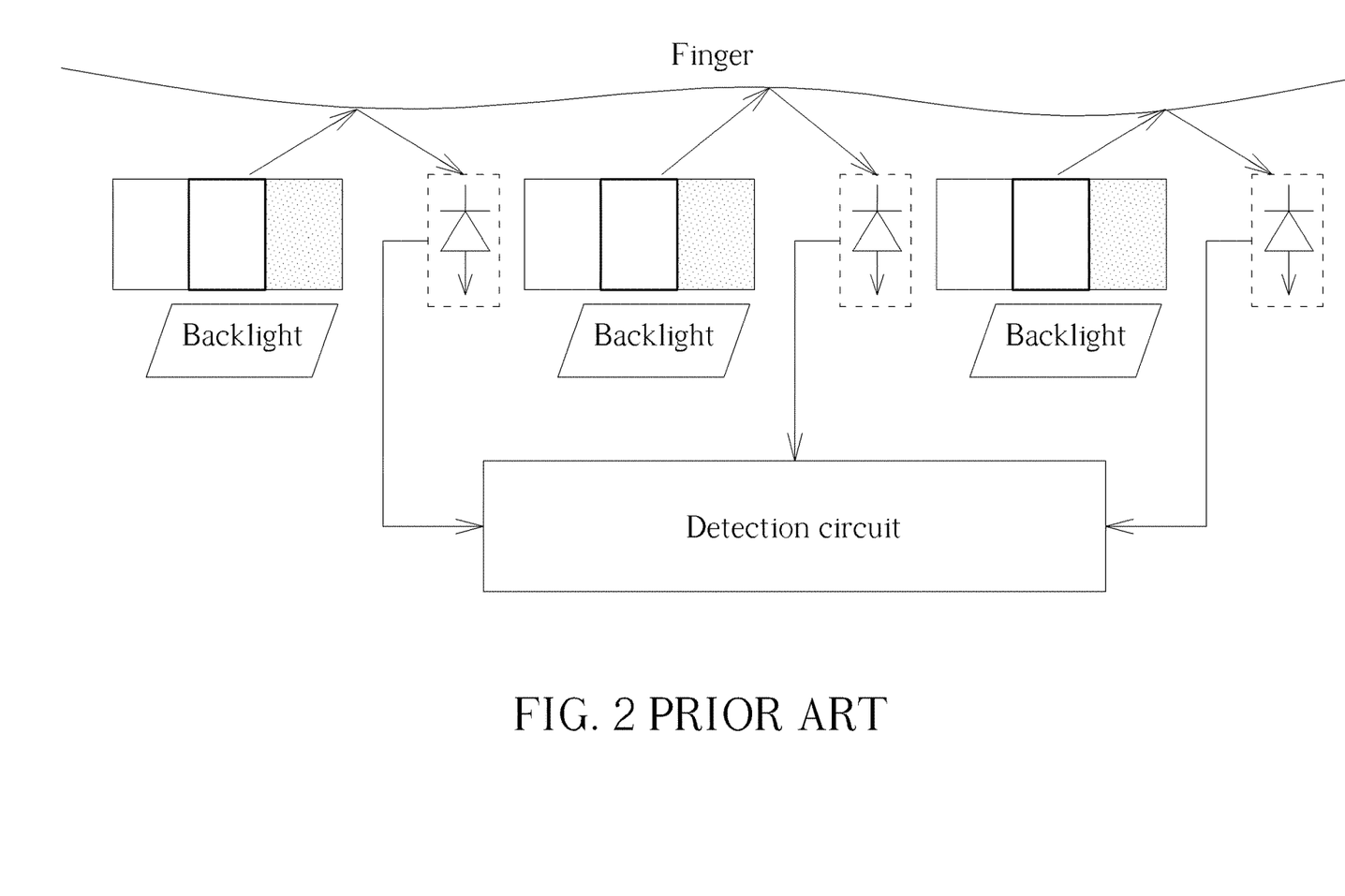
FIG. 2 illustrates an example of fingerprint detection.

FIG. 1 illustrates an example of a display panel. The display panel may comprise a backlight, display units such as red (R), green (G), and blue (B) display units, gate lines, data lines such as R, G, and B data lines, photo detectors (PDs), and PD sensing lines, where the legend such as R, G, and B may indicate the respective colors of the display units. An example of fingerprint detection may be illustrated as shown in FIG. 2. Respective portions of the backlight may provide light through the R, G, and B display units. The surface of a finger (e.g. fingertip thereof) may reflect a portion of the light, and the PDs may receive the reflected light to generate signals. As a result, the detection circuit may detect the signals, for obtaining distribution of the fingerprint.

Figure 3:
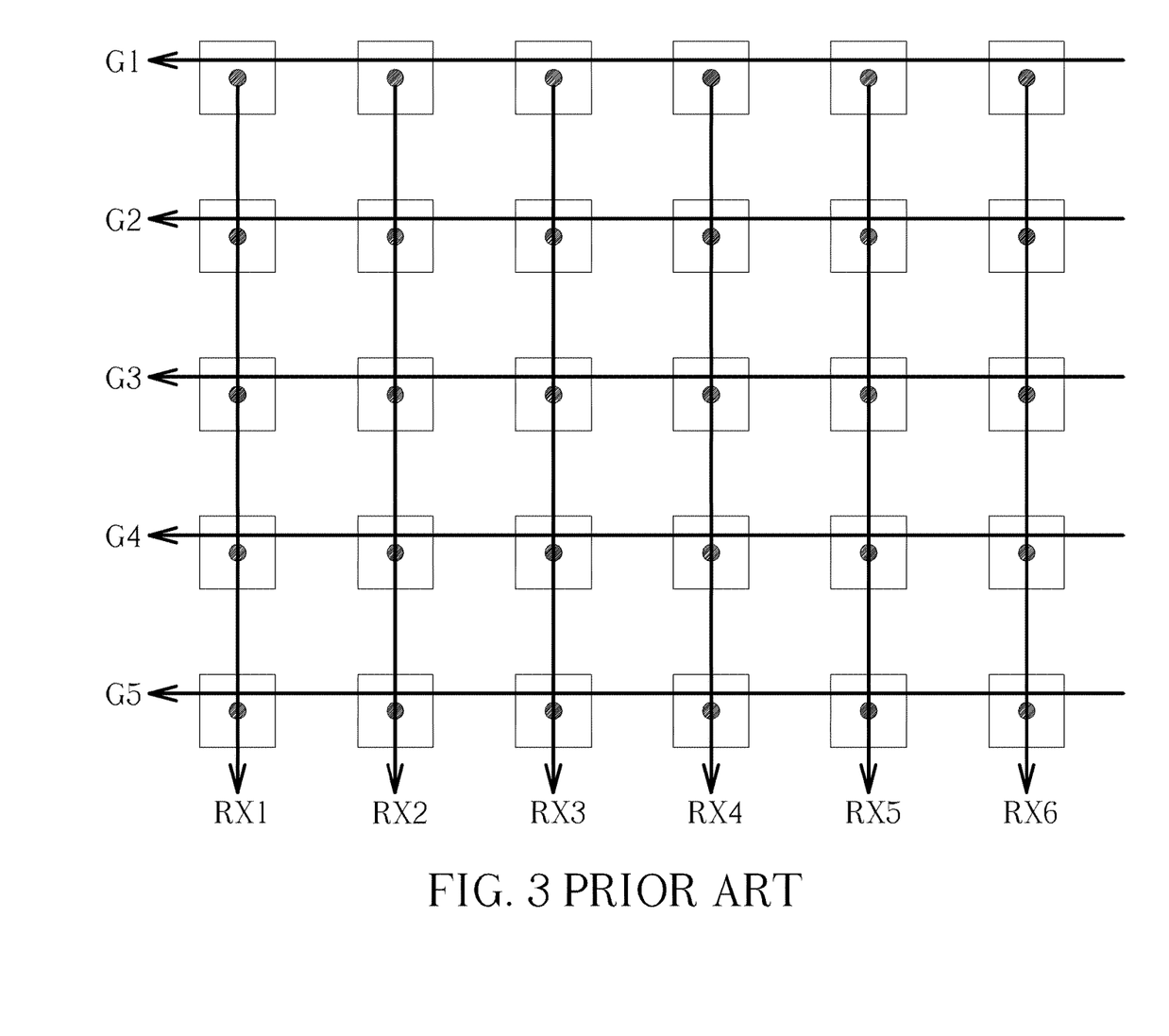
FIG. 3 illustrates an example of an optical fingerprint sensor.

FIG. 3 illustrates an example of an optical fingerprint sensor, where the small squares may represent the PDs, respectively. The dots illustrated in the small squares may indicate that a signal of each of the PDs may be received through one of the receiving lines RX1, RX2, RX3, RX4, RX5, RX6, etc. under control of one of the gating lines G1, G2, G3, G4, G5, etc. For example, a gating signal on the gating line G1 may allow signals of the first row of PDs to be received through the receiving lines RX1, RX2, RX3, RX4, RX5, RX6, etc., a gating signal on the gating line G2 may allow signals of the second row of PDs to be received through the receiving lines RX1, RX2, RX3, RX4, RX5, RX6, etc., and the rest may be deduced by analogy. As illustrated in an equivalent circuit shown in FIG. 4, a column of PDs within the optical fingerprint sensor shown in FIG. 3 may be coupled to a detection circuit. The traces between the optical fingerprint sensor and the detection circuit are quite long, and parasitic capacitance is typically unavoidable. More particularly, the current generated by a PD is typically very weak (e.g. 1 pico-ampere (pA)), and there may be various sources of noise, causing difficulty of signal detection. As a result, the output signal OUT_SE of the detection circuit cannot accurately indicate a corresponding portion of a fingerprint.

Figure 4:
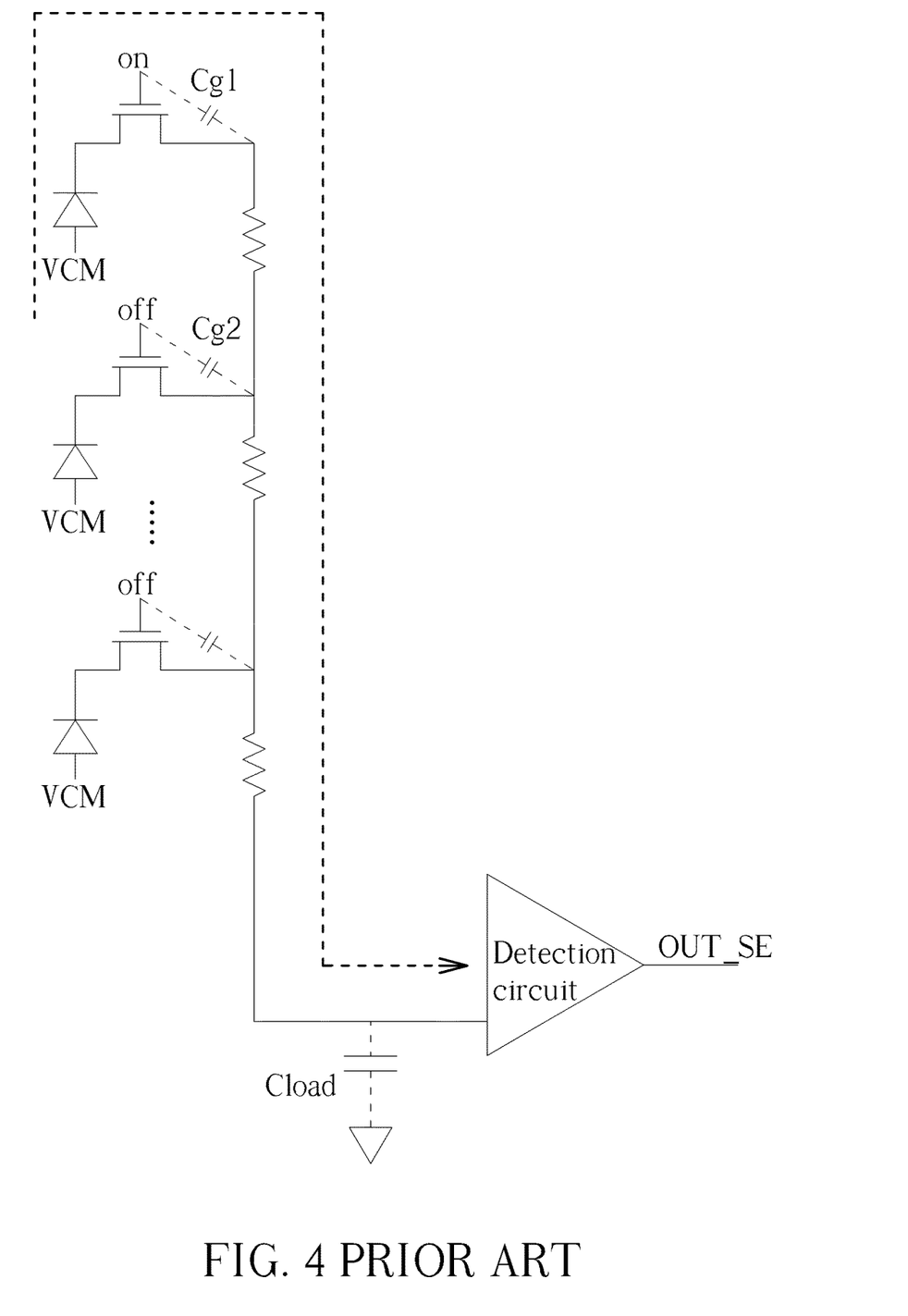
FIG. 4 illustrates an example of an equivalent circuit of a column of PDs within the optical fingerprint sensor shown in FIG. 3.

For example, the noise generated by on/off switching of the switches may pass through the parasitic capacitance such as Cg1, Cg2, etc., and may affect the signal received by the detection circuit. If there are a hundred switches on the entire path, there are at least a hundred noise sources corresponding to the hundred switches. In addition, for normal operations of the PDs, a bias voltage VCM is typically required, and any jitter of this voltage may also affect the signal received by the detection circuit. Additionally, the parasitic capacitance such as Cload may exist on the traces, and noise may be coupled through it if there is noise at the other side thereof. Thus, a novel architecture is needed for enhancing overall performance.

SUMMARY OF THE INVENTION

It is an objective of the present invention to provide a display panel and an associated electronic device, in order to solve the above problems.

It is another objective of the present invention to provide a display panel and an associated electronic device, in order to enhance overall performance of the display panel.

At least one embodiment of the present invention provides a display panel, where the display panel comprises a plurality of display blocks, a plurality of light sensors, a plurality of sets of switches that are coupled to the plurality of light sensors, and a detection circuit. For example, the plurality of display blocks may be arranged to display images, wherein each of the plurality of display blocks comprises one or more display units. The plurality of light sensors may be arranged to perform light sensing, wherein the display panel utilizes at least one portion of the plurality of display blocks as at least one light source for performing the light sensing. In addition, the plurality of sets of switches may be arranged to combine the plurality of light sensors into a plurality of combined sensors, respectively, wherein the plurality of sets of switches operate according to a plurality of switching signals, respectively. Additionally, the detection circuit may be coupled to two sets of combined sensors within the plurality of combined sensors, and may be arranged to detect a voltage level of a combined sensor of one set of the two sets of combined sensors according to a reference voltage level, for performing fingerprint detection through the display panel, wherein the reference voltage level is obtained from another set of the two sets of combined sensors.

In addition to the above display panel, the present invention also provides an electronic device that comprises the display panel, wherein the display panel is integrated into the electronic device.

The present invention display panel and associated electronic device can guarantee that the whole system (e.g. the electronic device) can operate properly, to prevent the related art problems. In addition, the present invention display panel is applicable to reducing noise coupling and enhancing sensing signals in an optical fingerprint sensor thereof (which may comprise the plurality of light sensors) with aid of switch arrangement, to enhance the overall performance.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
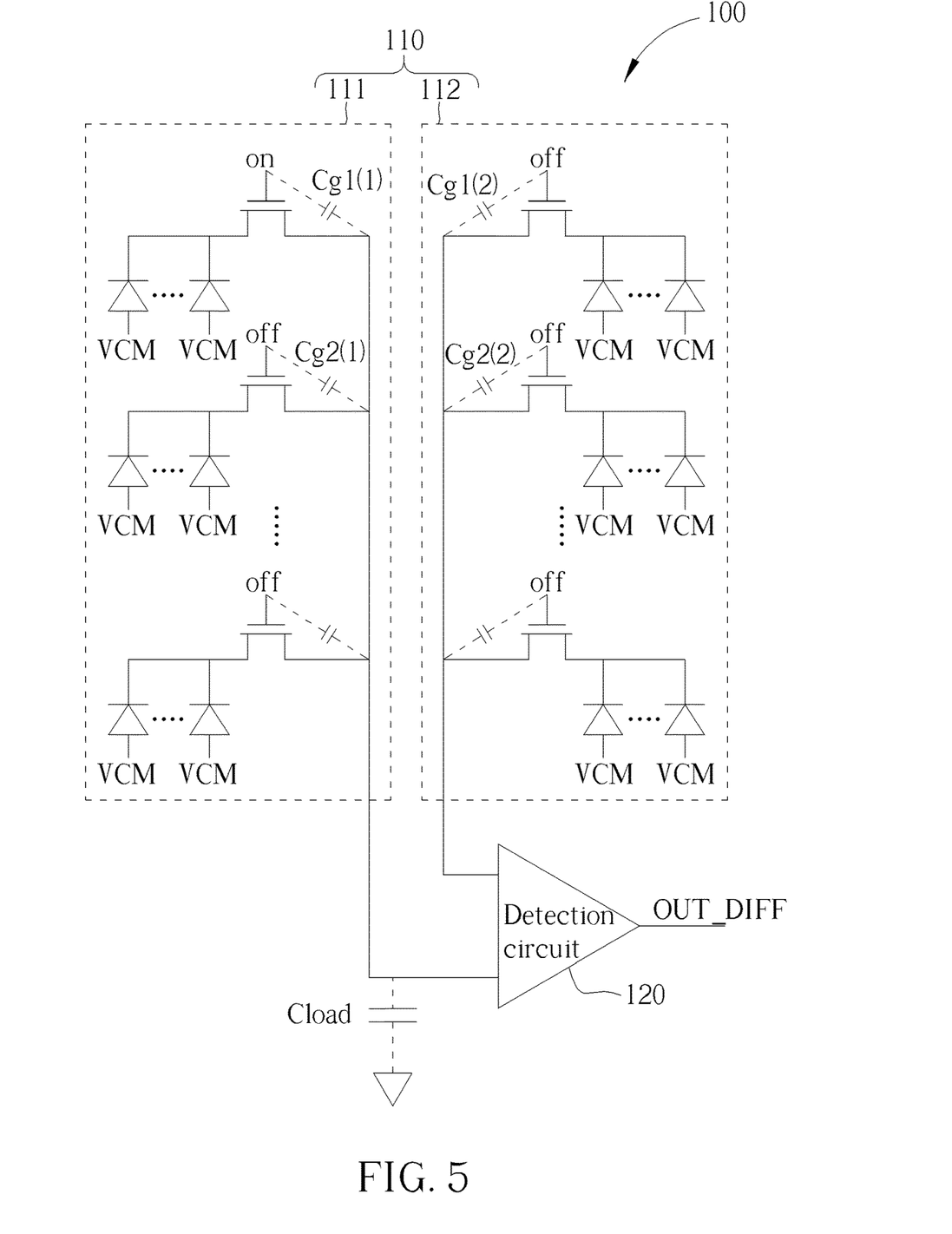
FIG. 5 is a circuit diagram of a display panel comprising an enhancement type optical fingerprint sensor according to an embodiment of the present invention.
Figure 6:
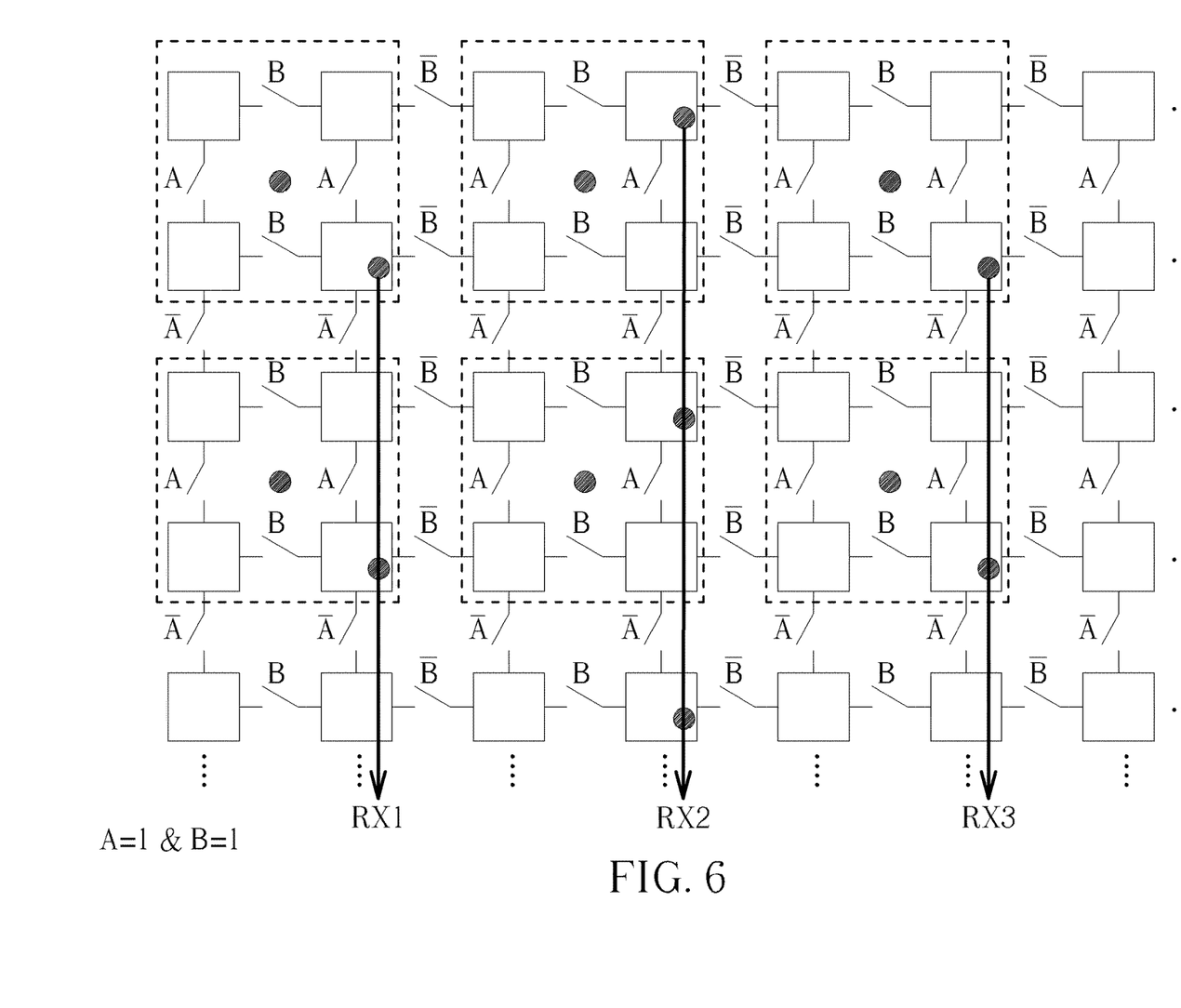
FIG. 6 illustrates an example of a first group of combined sensors within the enhancement type optical fingerprint sensor.
Figure 7:
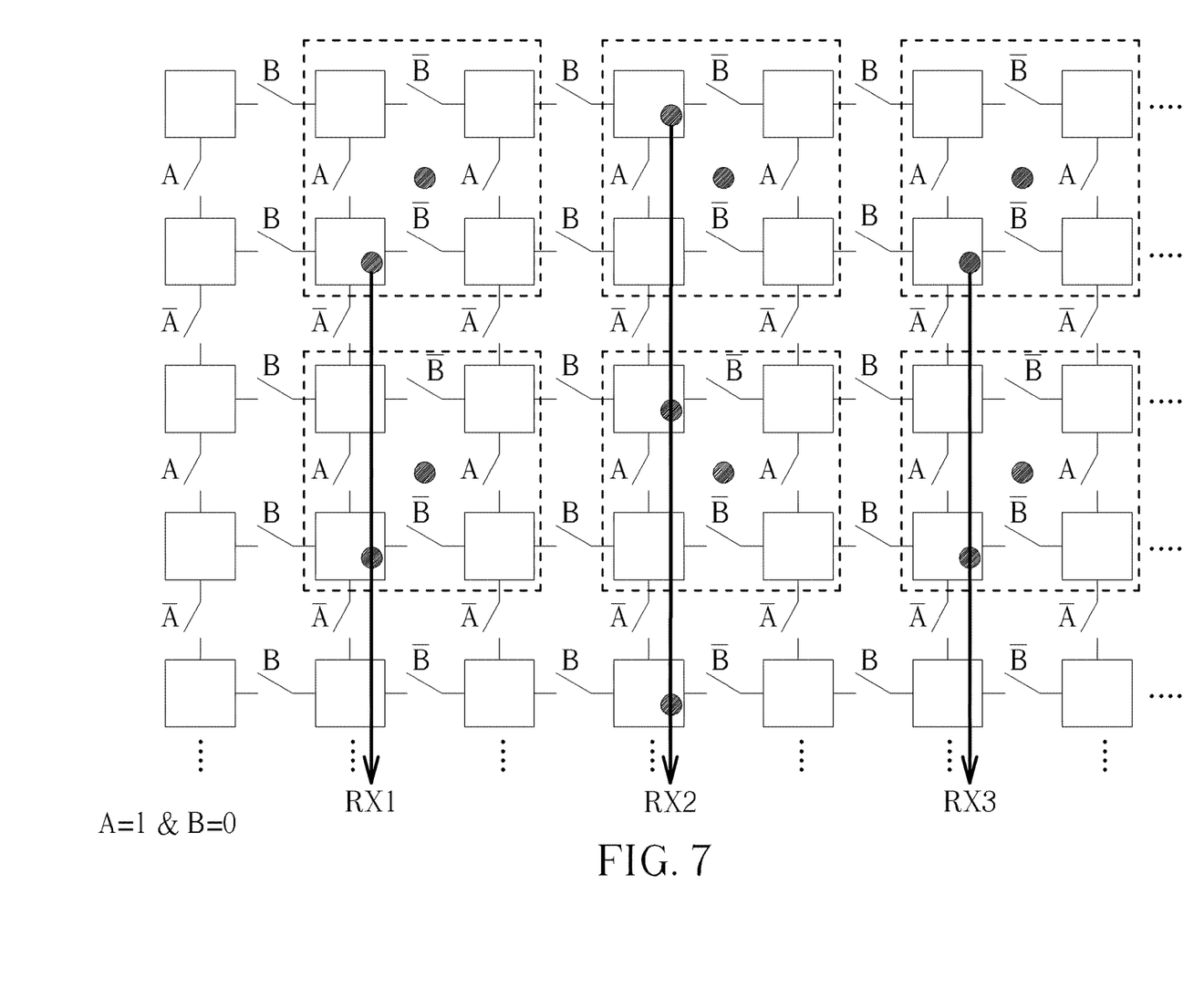
FIG. 7 illustrates an example of a second group of combined sensors within the enhancement type optical fingerprint sensor.
Figure 8:
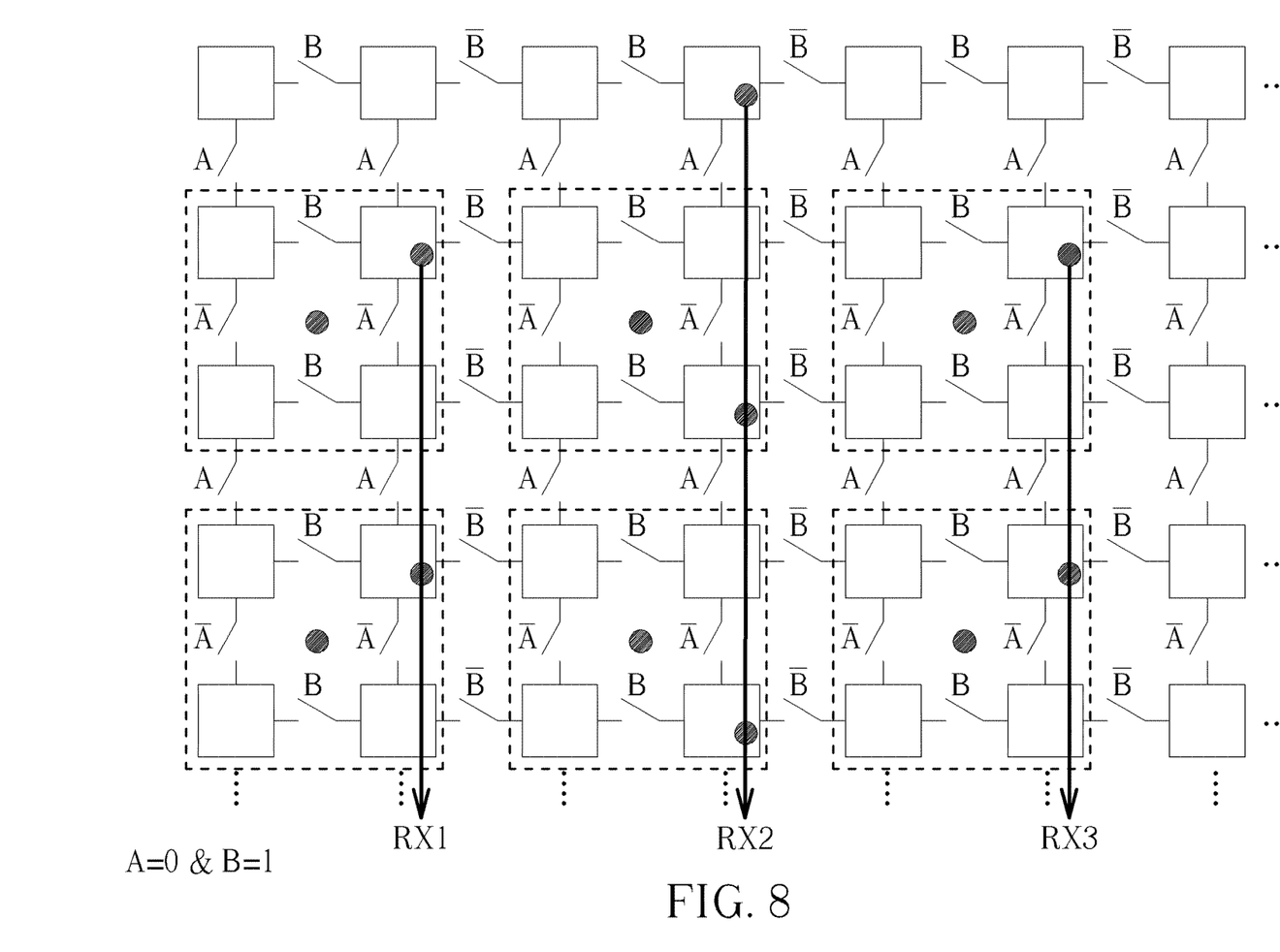
FIG. 8 illustrates an example of a third group of combined sensors within the enhancement type optical fingerprint sensor.
Figure 9:
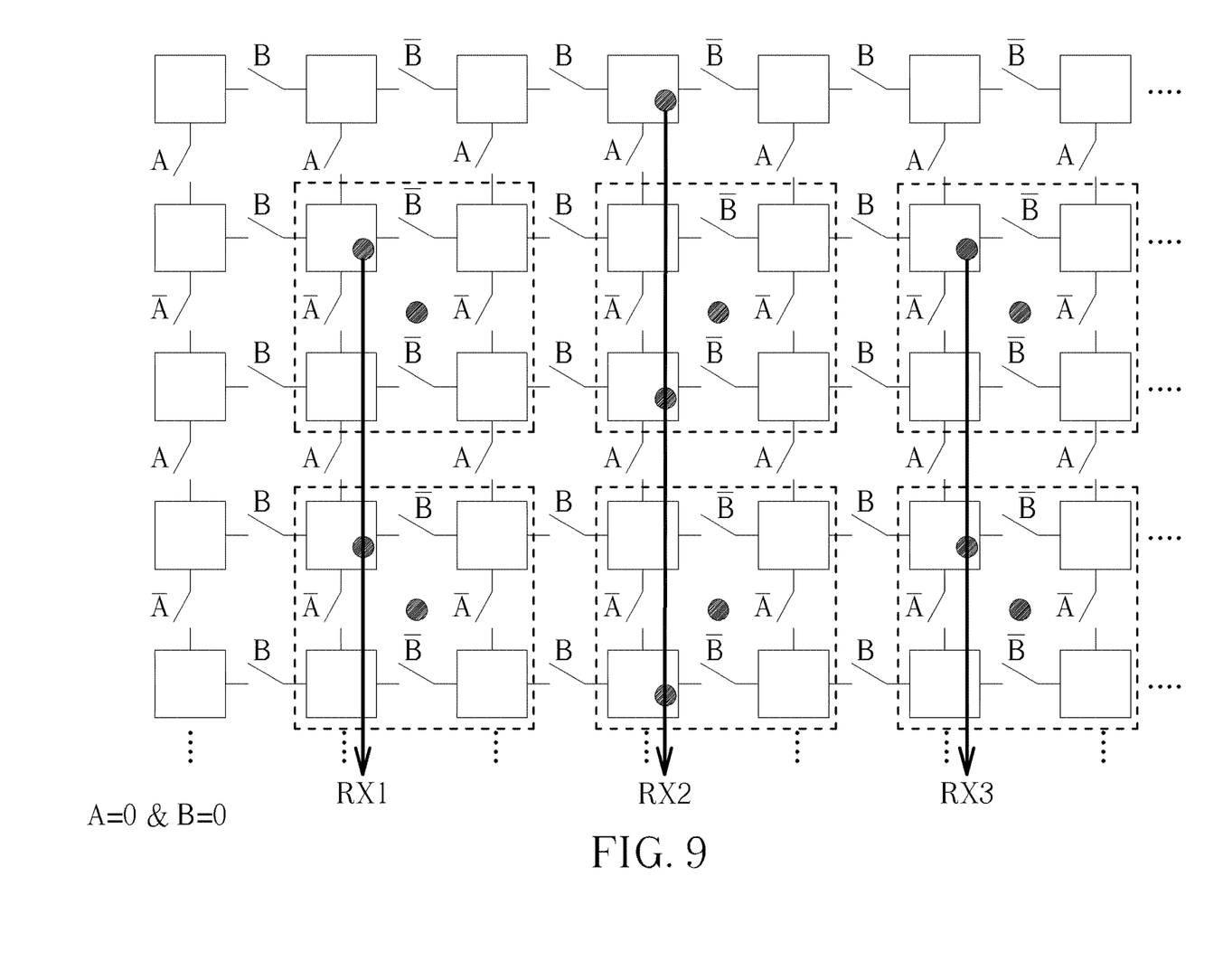
FIG. 9 illustrates an example of a fourth group of combined sensors within the enhancement type optical fingerprint sensor.

FIG. 5 is a circuit diagram of a display panel 100 comprising an enhancement type optical fingerprint sensor according to an embodiment of the present invention. The display panel 100 may comprise a plurality of display blocks arranged to display images, and each of the plurality of display blocks may comprise one or more display units. For better comprehension, the plurality of display blocks of the display panel 100 may be implemented according to the example shown in FIG. 1, and therefore, the one or more display units may comprise R, G, and B display units, and the display panel 100 may further comprise gate lines, data lines (e.g. R, G, and B data lines), and a backlight such as that shown in FIG. 1, but the present invention is not limited thereto. More particularly, the display panel 100 (e.g. the enhancement type optical fingerprint sensor) may comprise a plurality of light sensors (e.g. a plurality of PDs) that may be arranged in a plurality of dual-set modules {110} such as the dual-set module 110 shown in FIG. 5, a plurality of sets of switches that are coupled to the plurality of light sensors (e.g. coupled between the plurality of light sensors), and a plurality of detection circuits {120} such as the detection circuit 120 shown in FIG. 5. As shown in FIG. 1, the dual-set module 110 may comprise two combined-sensor sets 111 and 112. Similarly, the plurality of dual-set modules {110} may comprise the combined-sensor sets {111} and {112} thereof, respectively According to this embodiment, the plurality of light sensors may be arranged to perform light sensing, and the display panel 100 may utilize at least one portion (e.g. a portion or all) of the plurality of display blocks as at least one light source for performing the light sensing. In addition, the plurality of sets of switches (not shown in FIG. 1) may be arranged to combine the plurality of light sensors into a plurality of combined sensors, respectively, and the plurality of sets of switches may operate according to a plurality of switching signals, respectively. Additionally, the detection circuit 120 may be coupled to two sets of combined sensors within the plurality of combined sensors (e.g. the respective combined-sensors of the two combined-sensor sets 111 and 112), and may be arranged to detect a voltage level of a combined sensor of one set of the two sets of combined sensors according to a reference voltage level, for performing fingerprint detection through the display panel 100, where the reference voltage level is obtained from another set of the two sets of combined sensors. As shown in FIG. 5, the output terminals of any row of light sensors (e.g. the upper terminals of any row of PDs) in any of the two combined-sensor sets 111 and 112 may be electrically connected to each other through some associated switches within the plurality of sets of switches to allow this row of light sensors (e.g. this row of PDs) to form a corresponding combined sensor, and the respective combined sensors of the two combined-sensor sets 111 and 112 may be taken as examples of the one set and the other set (i.e. the aforementioned another set) of the two sets of combined sensors, respectively.

As the circuit diagram shown in FIG. 5 may indicate an equivalent circuit of one of multiple operational units of the enhancement type optical fingerprint sensor within the display panel 100, each combined sensor of the respective combined sensors of the two sets of combined sensors may be illustrated with a corresponding row of PDs in any of the two combined-sensor sets 111 and 112 shown in FIG. 5, but the present invention is not limited thereto. For example, if there are four light sensors in each combined sensor of the plurality of combined sensors, any row of PDs in any of the two combined-sensor sets 111 and 112 in this circuit diagram may represent a combined sensor comprising four light sensors; if there are nine light sensors in each combined sensor of the plurality of combined sensors, any row of PDs in any of the two combined-sensor sets 111 and 112 in this circuit diagram may represent a combined sensor comprising nine light sensors; if there are sixteen light sensors in each combined sensor of the plurality of combined sensors, any row of PDs in any of the two combined-sensor sets 111 and 112 in this circuit diagram may represent a combined sensor comprising sixteen light sensors; and the rest may be deduced by analogy.

Based on the architecture shown in FIG. 5, the display panel 100 (e.g. the enhancement type optical fingerprint sensor) may obtain the combined sensing signals from the respective sensing signals of the respective light sensors of the plurality of combined sensors during the fingerprint detection, and any of the combined sensing signals should be much stronger than a single sensing signal of a single light sensor, so the signal-to-noise ratio (SNR) can be greatly increased. In addition, the detection circuit 120 may detect the voltage level of the combined sensor of the one set of the two sets of combined sensors according to the reference voltage level that is obtained from the other set of the two sets of combined sensors, the noise coupling effect corresponding to the one set of the two sets of combined sensors may be reduced (e.g. canceled) by the noise coupling effect corresponding to the other set of the two sets of combined sensors, so the SNR can be further increased. Therefore, the output signal OUT_DIFF of the detection circuit 120 can accurately indicate a corresponding portion of a fingerprint. As a result, the overall performance can be enhanced.

In the above embodiment, the display panel 100 (more particularly, the plurality of display blocks therein) may be implemented by ways of liquid-crystal display (LCD) technology, organic light-emitting diode (OLED) technology, micro-LED (mLED) technology, etc.; and the plurality of light sensors may be implemented by ways of photo diodes, photo transistors, etc.

FIGS. 6-9 illustrate examples of a first group of combined sensors, a second group of combined sensors, a third group of combined sensors, and a fourth group of combined sensors within the enhancement type optical fingerprint sensor, respectively, where any of the small squares and any of the blocks illustrated with dashed lines in any of FIGS. 6-9 may represent one of the plurality of light sensors (e.g. the plurality of PDs) and one of the plurality of combined sensors, respectively. The switching signals A and B and the respective inverted signals A_bar and B_bar (respectively labeled "$\overline{A}$" and "$\overline{B}$" in FIGS. 6-9, for brevity) of the switching signals A and B may be taken as examples of the plurality of switching signals, but the present invention is not limited thereto. FIGS. 6-9 may correspond to the case of A=1 and B=1, the case of A=1 and B=0, the case of A=0 and B=1, the case of A=0 and B=0, respectively, where the logic state 1 may represent the turn-on state for turning on the associated switches, and the logic state 0 may represent the turn-off state for turning off the associated switches. As a result, the display panel 100 may combine various combinations of light sensors into the first group of combined sensors, the second group of combined sensors, the third group of combined sensors, and the fourth group of combined sensors, respectively.

For better comprehension, the dots illustrated in some of the small squares in any of FIGS. 6-9 may indicate that a sensing signal of each of the plurality of combined sensors may be received through one of the receiving lines RX1, RX2, RX3, etc. under control of a certain gating line of the gating lines {G2, G1}, {G4, G3}, etc., where the gating lines {G2, G1} are coupled to some predetermined light sensors in the first and the second rows of light sensors (e.g. the light sensors labeled with dots), the gating lines {G4, G3} are coupled to some predetermined light sensors in the third and the fourth rows of light sensors (e.g. the light sensors labeled with dots), and the rest may be deduced by analogy. Taking FIG. 6 as an example, a gating signal on the gating line G1 may allow signals of the first combined sensor (e.g. the leftmost combined sensor), the third combined sensor, etc. in the first row of combined sensors to be received through odd receiving lines such as the receiving lines RX1, RX3, etc., and a gating signal on the gating line G2 may allow signals of the second combined sensor, etc. in the first row of combined sensors to be received through even receiving lines such as the receiving lines RX2, etc.; a gating signal on the gating line G3 may allow signals of the first combined sensor (e.g. the leftmost combined sensor), the third combined sensor, etc. in the second row of combined sensors to be received through the odd receiving lines such as the receiving lines RX1, RX3, etc., and a gating signal on the gating line G4 may allow signals of the second combined sensor, etc. in the second row of combined sensors to be received through the even receiving lines such as the receiving lines RX2, etc.; and the rest may be deduced by analogy.

Please note that the dots labeled at the respective centers of the combined sensors in any of FIGS. 6-9 may indicate that the resolution of the fingerprint detection based on the plurality of combined sensors may be the same as the resolution of the fingerprint detection merely based on the light sensors. As the centers of all of the four groups of combined sensors may be regarded as a shifted version of the centers of the majority of the plurality of light sensors, with a vertical shift amount of a half of the vertical pitch of the plurality of light sensors and a horizontal shift amount of a half of the horizontal pitch of the plurality of light sensors, the resolution of the fingerprint detection using the enhancement type optical fingerprint sensor and the resolution of the fingerprint detection using the conventional optical fingerprint sensor may be equal to each other. In comparison with the related art, the display panel 100 can enhance the sensing signals with aid of switch arrangement without introducing side effects such as reduced resolution. Examples of the switch arrangement may include, but are not limited to: the arrangement of the switches between the light sensors (e.g. the switches controlled by the plurality of switching signals such as the switching signals A, B, etc.), the arrangement of the switches for probing the combined sensors (e.g. the switches controlled by the gating signals on the gating lines {G2, G1}, {G4, G3}, etc.), the arrangement with a reduced switch count and a reduced amount of parasitic capacitance such as Cg1(1), Cg2(1), etc. regarding the switches on the traces from the detection circuit 120 toward the combined sensors in the combined-sensor set 111 (e.g. the switch count of these switches is lower than that of the switches on the traces from the detection circuit toward the PDs in FIG. 4), and the arrangement with a reduced switch count and a reduced amount of parasitic capacitance such as Cg1(2), Cg2(2), etc. regarding the switches on the traces from the detection circuit 120 toward the combined sensors in the combined-sensor set 112 (e.g. the switch count of these switches is lower than that of the switches on the traces from the detection circuit toward the PDs in FIG. 4).

Figure 10:
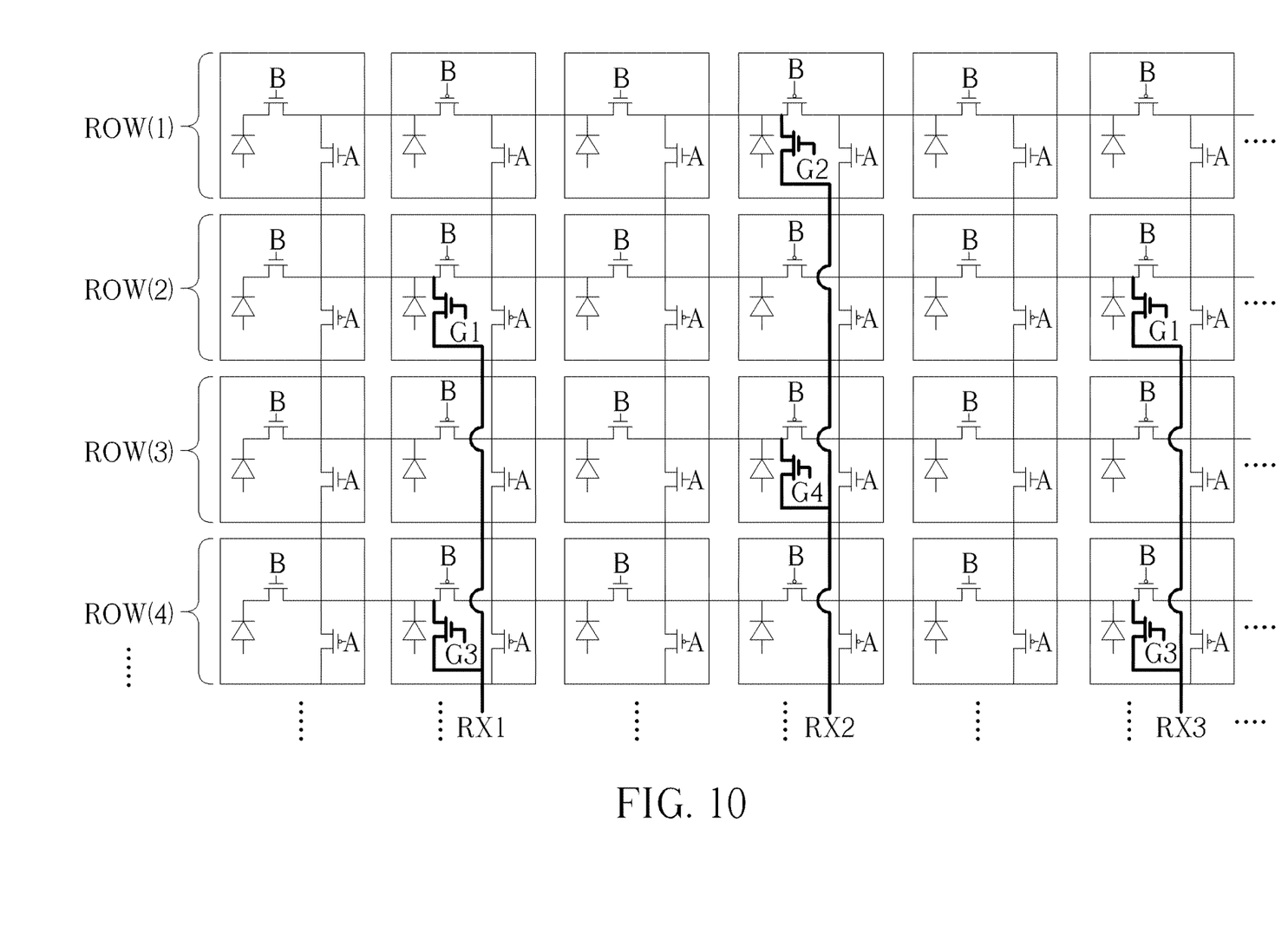
FIG. 10 illustrates some implementation details of the display panel comprising the enhancement type optical fingerprint sensor according to an embodiment of the present invention.

FIG. 10 illustrates some implementation details of the display panel 100 comprising the enhancement type optical fingerprint sensor according to an embodiment of the present invention, where any of the squares in FIG. 10 may represent a sensing unit of a plurality of sensing units within the enhancement type optical fingerprint sensor. The sensing unit may comprise one of the plurality of light sensors (e.g. the plurality of PDs) and some switches. Regarding any sensing unit that is not directly connected to any of the gating lines G1, G2, G3, G4, etc., this sensing unit may comprise two switches respectively controlled by the switching signals A and B. Regarding any sensing unit that is directly connected to a certain gating line of the gating lines G1, G2, G3, G4, etc., this sensing unit may comprise two switches respectively controlled by the switching signals A and B and a switch controlled by a gating signal on this gating line). For example, the first row of sensing units ROW(1) may comprise the first row of light sensors in any of FIGS. 6-9, the second row of sensing units ROW(2) may comprise the second row of light sensors in any of FIGS. 6-9, the third row of sensing units ROW(3) may comprise the third row of light sensors in any of FIGS. 6-9, the fourth row of sensing units ROW(4) may comprise the fourth row of light sensors in any of FIGS. 6-9, and the rest may be deduced by analogy.

According to this embodiment, the plurality of sets of switches may be implemented to be Metal Oxide Semiconductor Field Effect Transistors (MOSFETs), but the present invention is not limited thereto. In some embodiments, the plurality of sets of switches may be implemented to be any type of multiple other types of transistors. As two sets of switches respectively controlled by the switching signals A and B in any of FIGS. 6-9 may be implemented to be N-type MOSFETs (NMOSFETs) in FIG. 10, and as two sets of switches respectively controlled by the respective inverted signals A_bar and B_bar of the switching signals A and B in any of FIGS. 6-9 may be implemented to be P-type MOSFETs (PMOSFETs) in FIG. 10, the total number of switching signals for controlling the plurality of sets of switches may be changed from four to two, where the inverted signals A_bar and B_bar may be respectively replaced with the switching signals A and B in this embodiment. For brevity, similar descriptions for this embodiment are not repeated in detail here.

Based on the architecture shown in FIGS. 5-10, some implementation details may be described as follows. According to some embodiments, the detection circuit 120 may be coupled to the two sets of combined sensors (e.g. the respective combined-sensors of the two combined-sensor sets 111 and 112) in a differential manner, and the detection circuit 120 may detect the voltage level of the combined sensor of the one set of the two sets of combined sensors (e.g. the voltage level at the output terminal of the uppermost combined sensor in the combined-sensor set 111, such as that of the upper terminal of this combined sensor) while using the traces toward the other set of the two sets of combined sensors (e.g. the traces from the detection circuit 120 toward the combined sensors in the combined-sensor set 112) as differential reference. When the detection circuit 120 is detecting the voltage level of the combined sensor of the one set of the two sets of combined sensors, the detection circuit 120 is not performing detection on the other set of the two sets of combined sensors. For example, during a first sub-phase of a detection phase regarding the two sets of combined sensors, the detection circuit 120 may detect the voltage level of the combined sensor of the one set of the two sets of combined sensors (e.g. the voltage level at the output terminal of the uppermost combined sensor in the combined-sensor set 111, such as that of the upper terminal of this combined sensor), but the present invention is not limited thereto. The respective roles of the two combined-sensor sets 111 and 112 may be exchanged. For example, during a second sub-phase of the detection phase, the detection circuit 120 may detect a voltage level of a combined sensor of the other set of the two sets of combined sensors (e.g. the voltage level at the output terminal of the uppermost combined sensor in the combined-sensor set 112, such as that of the upper terminal of this combined sensor). More particularly, during the first sub-phase, the detection circuit 120 may detect the voltage level of the combined sensor of the one set of the two sets of combined sensors while using the traces toward the other set of the two sets of combined sensors as differential reference; and during the second sub-phase, the detection circuit 120 may detect the voltage level of the combined sensor of the other set of the two sets of combined sensors while using the traces toward the one set of the two sets of combined sensors as differential reference.

According to some embodiments, the plurality of combined sensors may comprise a plurality of groups of combined sensors, such as the first group of combined sensors, the second group of combined sensors, the third group of combined sensors, and the fourth group of combined sensors respectively shown in FIGS. 6-9. The plurality of sets of switches (e.g. the switches between the light sensors in any of FIGS. 6-9) may combine the plurality of light sensors into the plurality of groups of combined sensors in turn according to different combinations of respective states of the plurality of switching signals (e.g. the switching signals A, B, etc.), respectively. In addition, regarding any combined sensor within the plurality of combined sensors, the display panel 100 may utilize at least one signal (e.g. one or more signals) of the plurality of switching signals to make the respective output terminals of all light sensors within this combined sensor be electrically connected to each other to form this combined sensor, and may utilize at least one signal (e.g. one or more signals) of the plurality of switching signals to make the respective output terminals of the aforementioned all light sensors within this combined sensor be electrically disconnected from the respective output terminals of the respective light sensors of neighboring combined sensors within the plurality of combined sensors. More particularly, regarding the aforementioned any combined sensor within the plurality of combined sensors, a group of switches corresponding to this combined sensor within the plurality of sets of switches may electrically connect the respective output terminals of all light sensors within this combined sensor to each other to form this combined sensor, and another group of switches surrounding this combined sensor within the plurality of sets of switches may prevent the respective output terminals of the aforementioned all light sensors within this combined sensor from being electrically connected to the respective output terminals of the respective light sensors of the neighboring combined sensors within the plurality of combined sensors.

According to some embodiments, a trace from the detection circuit 120 toward any combined sensor within the plurality of combined sensors (such as that indicated by one of the blocks illustrated with dashed lines in any of FIGS. 6-9) through one of the receiving lines RX1, RX2, RX3, etc. may be coupled to at least one light sensor of this combined sensor. For example, the trace from the detection circuit 120 toward this combined sensor is not directly connected to one or more remaining light sensors of this combined sensor. According to some embodiments, the display panel 100 may comprise a signal generator that is coupled to the plurality of sets of switches, and the signal generator may be arranged to generate the plurality of switching signals, to control the plurality of sets of switches.

According to some embodiments, as the display panel 110 may comprise the plurality of dual-set modules {110} and the plurality of detection circuits {120}, similar descriptions may be applied to any of other dual-set modules within the plurality of dual-set modules {110} (e.g. another dual-set module comprising two sets of other combined sensors within the plurality of combined sensors) and any of other detection circuits within the plurality of detection circuits {120} (e.g. another detection circuit). For example, the other detection circuit (i.e. the aforementioned another detection circuit) may be coupled to the two sets of other combined sensors, and may be arranged to detect a voltage level of a combined sensor of one set of the two sets of other combined sensors according to another reference voltage level, for performing the fingerprint detection through the display panel 100, where the other reference voltage level (i.e. the aforementioned another reference voltage level) is obtained from another set of the two sets of other combined sensors. For brevity, similar descriptions for these embodiments are not repeated in detail.

Figure 11:
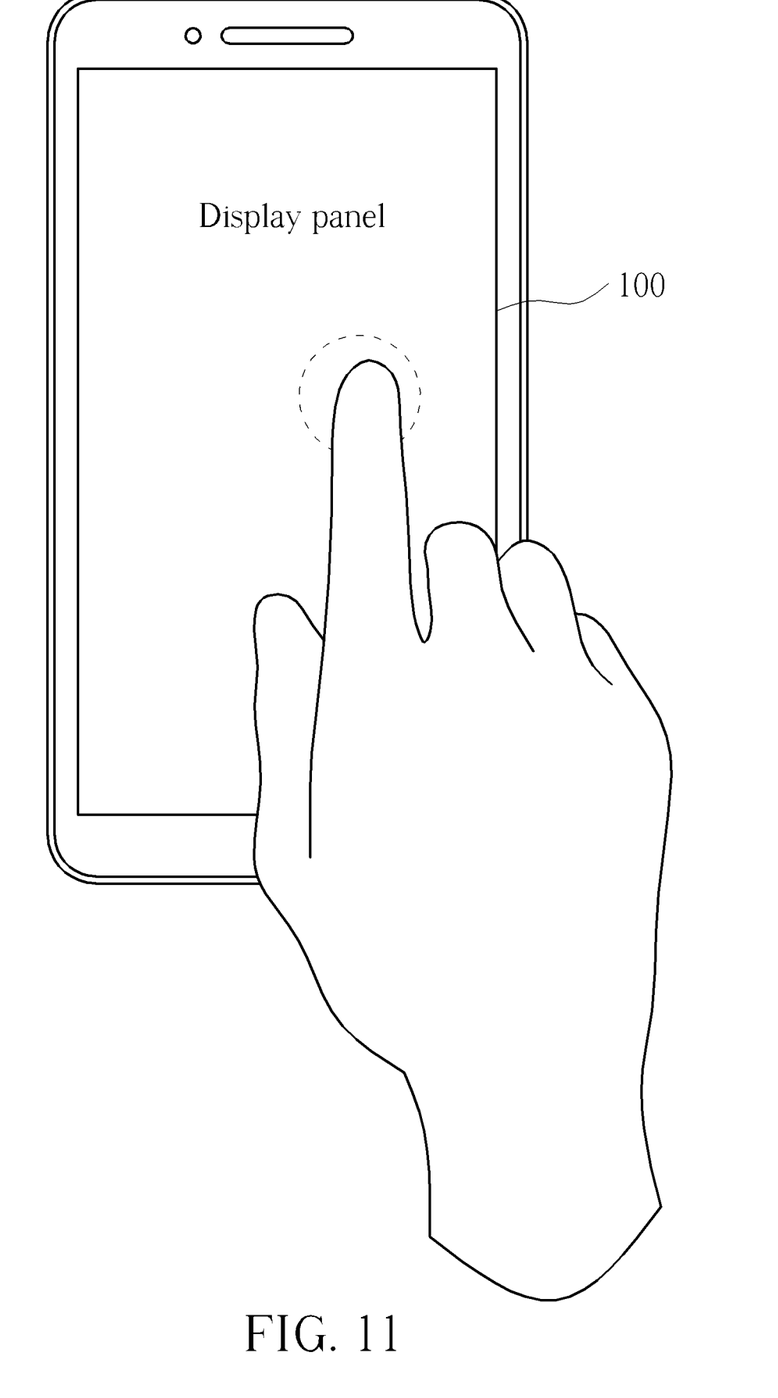
FIG. 11 is a diagram of an electronic device according to an embodiment of the present invention.

FIG. 11 is a diagram of an electronic device according to an embodiment of the present invention, where the display panel 100 may be integrated into the electronic device. For better comprehension, the electronic device may be implemented to be a multifunctional mobile phone, but the present invention is not limited thereto. In some embodiments, the electronic device may be implemented to be any of a wearable device, a tablet computer, a laptop computer, etc. As shown in FIG. 11, a light pot displayed on the display panel 100 may play the role of the light source for the fingerprint detection. For brevity, similar descriptions for this embodiment are not repeated in detail.

Figure 12:
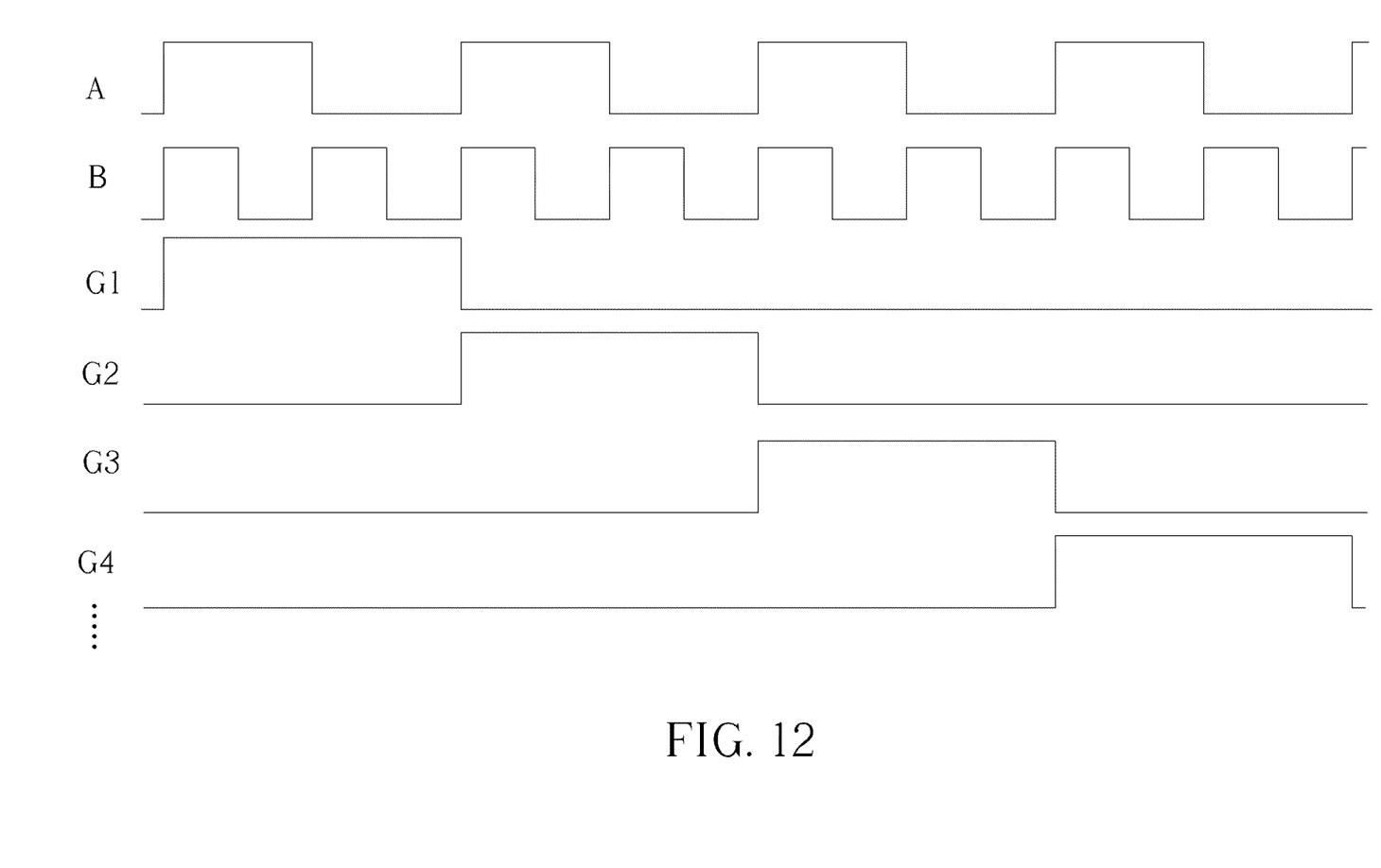
FIG. 12 illustrates associated signals of the display panel comprising the enhancement type optical fingerprint sensor according to an embodiment of the present invention.

FIG. 12 illustrates the associated signals of the display panel 100 according to an embodiment of the present invention. For example, a higher voltage level of any of these signals may represent the logic state 1, and a lower voltage level of any of these signals may represent the logic state 0, but the present invention is not limited thereto. In some embodiments, at least one portion (e.g. a portion or all)

of the signals shown in FIG. 12 may be inverted. For brevity, similar descriptions for this embodiment are not repeated in detail.

According to some embodiments, the switching signals A and B shown in FIG. 12 may be replaced with the inverted signals A_bar and B_bar, respectively, and the NMOSFETs and the PMOSFETs between the light sensors in the architecture shown in FIG. 10 may be replaced with MOSFETs having inverted polarity, such as PMOSFETs and NMOSFETs, respectively. For brevity, similar descriptions for these embodiments are not repeated in detail.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel, comprising:
    a plurality of display blocks, arranged to display images, wherein each of the plurality of display blocks comprises one or more display units;
    a plurality of light sensors, arranged to perform light sensing, wherein the display panel utilizes at least one portion of the plurality of display blocks as at least one light source for performing the light sensing;
    a plurality of sets of switches, coupled to the plurality of light sensors, arranged to combine the plurality of light sensors into a plurality of combined sensors, respectively, wherein the plurality of sets of switches operate according to a plurality of switching signals, respectively; and
    a detection circuit, coupled to a first set of combined sensors and a second set of combined sensors within the plurality of combined sensors, arranged to detect a voltage level of a combined sensor of the first set of combined sensors according to a reference voltage level, for performing fingerprint detection through the display panel, wherein the reference voltage level is obtained from the second set of combined sensors.

2. The display panel of claim 1, wherein the detection circuit is coupled to the two sets of combined sensors via differential signals; and the detection circuit detects the voltage level of the combined sensor of the first set of combined sensors while using traces toward the second set of the combined sensors as differential reference.

3. The display panel of claim 1, wherein when the detection circuit is detecting the voltage level of the combined sensor of the first set of combined sensors, the detection circuit is not performing detection on the second set of combined sensors.

4. The display panel of claim 1, wherein during a first sub-phase of a detection phase regarding the two sets of combined sensors, the detection circuit detects the voltage level of the combined sensor of the first set of combined sensors; and during a second sub-phase of the detection phase, the detection circuit detects a voltage level of a combined sensor of the second set of combined sensors.

5. The display panel of claim 4, wherein during the first sub-phase, the detection circuit detects the voltage level of the combined sensor of the first set of combined sensors while using traces toward the second set of combined sensors as differential reference; and during the second sub-phase, the detection circuit detects a voltage level of a combined sensor of the second set of combined sensors while using traces toward the first set of combined sensors as differential reference.

6. The display panel of claim 1, wherein the plurality of combined sensors comprises a plurality of groups of combined sensors; and the plurality of sets of switches combine the plurality of light sensors into the plurality of groups of combined sensors in turn according to different combinations of respective states of the plurality of switching signals, respectively.

7. The display panel of claim 1, wherein regarding any combined sensor within the plurality of combined sensors, the display panel utilizes at least a first signal of the plurality of switching signals to make output terminals of all light sensors within said combined sensor be electrically connected to each other to form said combined sensor, and utilizes at least a second signal of the plurality of switching signals to make the output terminals of said all light sensors within said combined sensor be electrically disconnected from output terminals of light sensors of neighboring combined sensors within the plurality of combined sensors.

8. The display panel of claim 1, wherein regarding any combined sensor within the plurality of combined sensors, a group of switches corresponding to said any combined sensor within the plurality of sets of switches electrically connect respective output terminals of all light sensors within said any combined sensor to each other to form said any combined sensor, and another group of switches surrounding said any combined sensor within the plurality of sets of switches prevent the respective output terminals of said all light sensors within said any combined sensor from being electrically connected to respective output terminals of respective light sensors of neighboring combined sensors within the plurality of combined sensors.

9. The display panel of claim 1, wherein a trace from the detection circuit toward any combined sensor within the plurality of combined sensors is coupled to at least one light sensor of said any combined sensor.

10. The display panel of claim 9, wherein the trace from the detection circuit toward said any combined sensor is not directly connected to one or more remaining light sensors of said any combined sensor.

11. The display panel of claim 1, further comprising:
    another detection circuit, coupled to a third set of combined sensors and a fourth set of combined sensors within the plurality of combined sensors, arranged to detect a voltage level of a combined sensor of the third set of combined sensors according to a reference voltage level, for performing the fingerprint detection through the display panel, wherein the reference voltage level is obtained from the fourth set of combined sensors.

12. An electronic device comprising the display panel of claim 1, wherein the display panel is integrated into the electronic device.

* * * * *